US009513920B2

(12) United States Patent
Godard et al.

(10) Patent No.: US 9,513,920 B2
(45) Date of Patent: Dec. 6, 2016

(54) COMPUTER PROCESSOR EMPLOYING SPLIT-STREAM ENCODING

(71) Applicant: Mill Computing, Inc., Palo Alto, CA (US)

(72) Inventors: Roger Rawson Godard, East Palo Alto, CA (US); Arthur David Kahlich, Sunnyvale, CA (US); David Arthur Yost, Los Altos, CA (US)

(73) Assignee: MILL COMPUTING, INC., Palo Alto, CA (US)

( * ) Notice: Subject to any disclaimer, the term of this patent is extended or adjusted under 35 U.S.C. 154(b) by 288 days.

(21) Appl. No.: 14/290,108

(22) Filed: May 29, 2014

(65) Prior Publication Data

US 2015/0347130 A1     Dec. 3, 2015

(51) Int. Cl.
     *G06F 9/22*           (2006.01)
     *G06F 9/30*           (2006.01)
     (Continued)

(52) U.S. Cl.
     CPC ............. *G06F 9/321* (2013.01); *G06F 9/3802* (2013.01); *G06F 9/3814* (2013.01);
     (Continued)

(58) Field of Classification Search
     CPC ...... G06F 9/321; G06F 9/3802; G06F 9/3814; G06F 9/3851; G06F 9/3889; G06F 9/3836; G06F 9/324
     See application file for complete search history.

(56) References Cited

U.S. PATENT DOCUMENTS 5,592,679 A   *   1/1997   Yung ..................... G06F 9/3836
                                                                   711/117
5,604,877 A      2/1997   Hoyt et al.
                      (Continued)

OTHER PUBLICATIONS

Decoupled Access/Execute Computer Architectures, James E Smith, 0149-7111/82/0000/0112$00.75 © 1982 IEEE, pp. 112-119.
(Continued)

*Primary Examiner* — Daniel Pan
(74) *Attorney, Agent, or Firm* — Gordon & Jacobson, P.C.

(57) ABSTRACT

A computer processor is operably coupled to a memory system. The memory system is configured to store instruction blocks, wherein each instruction block is associated with an entry address and multiple distinct instruction streams within the instruction block. The multiple distinct instruction streams include at least a first instruction stream and a second instruction stream. The first instruction stream has an instruction order that logically extends in a direction of increasing memory space relative to the entry address of the instruction block. The second instruction stream has an instruction order that logically extends in a direction of decreasing memory space relative to the entry address of the instruction block. The computer processor includes a number of multi-stage instruction processing components corresponding to the multiple distinct instruction streams within each instruction block. The number of multi-stage instruction processing components are configured to access and process in parallel instructions belonging to multiple distinct instruction streams of a particular instruction block stored in the memory system.

30 Claims, 6 Drawing Sheets

(51) Int. Cl.
*G06F 9/40* (2006.01)
*G06F 9/445* (2006.01)
*G06F 9/32* (2006.01)
*G06F 9/38* (2006.01)

(52) U.S. Cl.
CPC .......... *G06F 9/3836* (2013.01); *G06F 9/3851* (2013.01); *G06F 9/3889* (2013.01); *G06F 9/324* (2013.01)

(56) References Cited

U.S. PATENT DOCUMENTS

| | | | |
|---|---|---|---|
| 6,304,962 | B1 | 10/2001 | Nair |
| 2002/0087900 | A1* | 7/2002 | Homewood .......... G06F 1/3203 713/320 |
| 2004/0199732 | A1* | 10/2004 | Kelley .................. G06F 9/3814 711/158 |
| 2006/0026577 | A1* | 2/2006 | Dinechin ................ G06F 8/65 717/148 |
| 2007/0101101 | A1* | 5/2007 | Odahara ............. G06F 9/30149 712/210 |
| 2009/0235051 | A1* | 9/2009 | Codrescu ............ G06F 9/30069 712/205 |
| 2012/0173772 | A1* | 7/2012 | Durand .................. G06F 13/28 710/22 |

OTHER PUBLICATIONS

The Heads and Tails Instruction Format, Heidi Pan and Krste Asanovic, MIT Laboratory for Computer Science, Mar. 2003, pp. 131-132.

Heads and Tails: A Variable-Length Instruction Format Supporting Parallel Fetch and Decode, Heidi Pan and Krste Asanovic, Cases'01, Nov. 16-17, 2001, ACM 1581133995/01/0011.

Software Pipelining and Superblock Scheduling: Compilation Techniques for VLIW Machines, Meng Lee et al., computer Systems Laboratory, HPL-92-78, Jun. 1992.

Sound and Vision: A Technical Overview of the Emotion Engine, Jon Stokes, Feb. 16, 2000.

* cited by examiner

| dominant | is enabled iff entry signal is set and the load balancing scheme activates the stream I side |

| drive | is enabled iff dominant is set |

| select fetch/other | selects fetch iff dominant is set or entry signal is not set<br>selects other iff entry signal is set and dominant is not set |

| Instruction Fetch | is enabled iff dominant is set or entry signal is not set |

| Fetch (fetch CL corresponding to entry address into BB/EBB) | Fetch (fetch next CL for instruction stream I) | Decode (decode instruction 1 of instruction stream I) | Execute (execute operations of instruction 1 of instruction stream I) | | | | | |
|---|---|---|---|---|---|---|---|---|
| | Fetch (fetch previous CL for instruction stream II) | Decode (decode instruction 1 of instruction stream II) | Execute (execute operations of instruction 1 of instruction stream II) | | | | | |
| | | Fetch (fetch CL for instruction 2 of instruction stream I) | Decode (decode instruction 2 of instruction stream I) | Execute (execute operations of instruction 2 of instruction stream I) | | | | |
| | | Fetch (fetch CL for instruction 2 of instruction stream II) | Decode (decode instruction 2 of instruction stream II) | Execute (execute operations of instruction 2 of instruction stream II) | | | | |
| | | | | Fetch (fetch next CL for instruction 3 of instruction stream I) | Decode (decode instruction 3 of instruction stream I) | Execute (execute operations of instruction 3 of instruction stream I) | | |
| | | | | Fetch (fetch previous CL for instruction 3 of instruction stream II) | Decode (decode instruction 3 of instruction stream II) | Execute (execute operations of instruction 3 of instruction stream II) | | |
| | | | | | | Fetch (fetch CL for instruction 4 of instruction stream I) | Decode (decode instruction 4 of instruction stream I) | Execute (execute operations of instruction 4 of instruction stream I) |
| | | | | | | Fetch (fetch CL line for instruction 4 of instruction stream II) | Decode (decode instruction 4 of instruction stream II) | Execute (execute operations of instruction 4 of instruction stream II) |

FIG. 7

COMPUTER PROCESSOR EMPLOYING SPLIT-STREAM ENCODING

BACKGROUND OF THE INVENTION

1. Field

The present application relates to computer processors.

2. Related Art

A computer processor (or central processing unit or CPU) executes a sequence of instructions, typically obtained from main memory, which are executed in positional order except when redirected by a branch, jump, call, or similar control-flow operation (hereinafter "control-flow operation"). The order is important because there are often semantic dependencies among instructions in a sequence, and the machine state would be different if the instructions were executed in a different order. However, some sequences of instructions do not have to be issued in strict order. An important class of CPU so-called "wide issue" architectures can issue more than one instruction simultaneously.

Multi-threading, a common approach to parallel execution, specifies the program not as a single sequential stream of instructions, but as several such streams. Each stream may be executed by its own sub-CPU or pipeline, or the streams may be interleaved on a single CPU such that each uses resources left idle by the other streams. Sequential semantics are enforced within any single stream of instructions, but the streams themselves are considered to be independent, meaning that the execution order of instructions in one stream vs instructions in another stream doesn't matter except for certain specialized instructions that serve to synchronize the streams.

In another approach, typified by Very Long Instruction Word (VLIW) architectures, there is only one instruction stream, but each instruction may contain not just one, but several "operations", and all of these operations are executed simultaneously. The several operations within a single instruction are synchronized at every instruction issue cycle and thus advance in lock step. Thus, a given operation executed in a given instruction may be semantically dependent on any operation executed earlier, and operations that are executed in later instructions may be semantically dependent on the given operation, but operations within the same instruction cannot be dependent on each other. Compilers and other code generation software analyze the program and "schedule" individual operations into a sequence of instructions so as to maximize "instruction-level parallelism" (ILP), in other words, to maximize the number of operations per instruction. This maximization of ILP maximizes performance.

In existing art, there are CPUs that support multiple instruction streams for a single thread of execution. In these CPUs the instructions of the various streams are interleaved in memory. In some designs, a single instruction looks much like an instruction for a single-stream machine, and instructions for each stream occupy every Nth instruction in memory. In other schemes a group of sub-instructions to be executed in a single cycle are concatenated into a single instruction, which is then fetched as a unit. This approach can yield smaller programs because the instruction encoding can have a compact representation of idle streams and often can merge common information from several sub-instructions into a single shared representation.

Branches and other control-flow operations occur frequently in programs, control-flow target addresses are large, and many programs assume that a code pointer is the same size as a data pointer. Multiple instruction streams present problems with control-flow operations. In a single-stream machine, a control-flow operation contains or computes a single code address which is to be the start of subsequent execution. If there are multiple streams then each stream needs a target address to branch to. Requiring branches and other control-flow operations to have multiple targets (one for each stream) makes it impossible to express a control flow target in a simple address pointer of normal size. However, if the streams are interleaved then control-flow operations require only a single address, namely the point at which the interleaved streams start. Likewise, in a VLIW-architecture, the instruction can branch to a target instruction that necessarily redirects all the operation streams of the instruction as well.

Unfortunately, sequential interleave has problems too. Instructions are represented as bit patterns encoding the intended operation, arguments, and options and so on. Variable-length bit pattern encoding for an instruction (referred to herein as a "variable-length instruction") can be used to reduce the size of an instruction or to fit as much information within an instruction size (such as 32 bits) dictated by other CPU design considerations. However, variable-length instructions can be difficult to parse, and constraints with respect to power, circuit area, and timing can result in practical limitations on the number of variable-length instructions that can be decoded in a machine cycle. Variable-length instructions are used in x86 instruction set architectures. Fixed-length bit pattern encodings for an instruction (referred to herein as a "fixed-length instruction") have no parallelism constraints but are wasteful of bits and are quicker to thrash in the cache system, thus limiting the effectiveness of the cache system. Fixed-length instructions are used in the Intel® Itanium® Architecture and in RISC instruction set architectures.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Illustrative embodiments of the present disclosure are directed to a computer processing system that includes a computer processor operably coupled to a memory system. The memory system is configured to store instruction blocks, wherein each instruction block is associated with an entry address and multiple distinct instruction streams within the instruction block. The multiple distinct instruction streams include at least a first instruction stream and a second instruction stream. The first instruction stream has an instruction order that logically extends in a direction of increasing memory space relative to the entry address of the instruction block. The second instruction stream has an instruction order that logically extends in a direction of decreasing memory space relative to the entry address of the instruction block. The computer processor includes a number of multi-stage instruction processing components corresponding to the multiple distinct instruction streams within each instruction block. The number of multi-stage instruction processing components are configured to access and process in parallel instructions belonging to multiple distinct instruction streams of a particular instruction block stored in the memory system.

The multiple distinct instruction streams of each instruction block can include a single control-flow operation or multiple control-flow operations.

In one embodiment, each of the instruction streams includes instructions of a class different from the classes of instructions in other instruction streams in the same instruction block, and each of the multi-stage instruction processing components is associated with a corresponding class of instructions, and each respective multi-stage instruction processing component is configured to process instructions belonging to the particular class of instructions associated therewith. For example, the classes of instructions can includes a first class of instructions and a second class of instructions, wherein the first class of instructions includes instructions that perform flow-control operations and instructions that perform memory reference operations, and wherein the second class of instructions includes instructions that perform computational operations.

In another embodiment, each respective multi-stage instruction processing component includes a program counter, an instruction fetch unit and an associated instruction buffer. The program counter of a respective multi-stage instruction processing component can have a configuration that stores a memory address for an instruction belonging to a corresponding instruction stream of a particular instruction block stored in the memory system. The instruction fetch unit of the respective multi-stage instruction processing component can have a configuration that fetches from the memory system at least one instruction belonging to the corresponding instruction stream of the particular instruction block. The instruction buffer of the respective multi-stage instruction processing component can have a configuration that stores at least one instruction fetched from the memory system by the instruction fetch unit of the respective multi-stage instruction processing component. Each respective multi-stage instruction processing component can further include a decode stage and associated execution logic that are configured to process the at least one instruction stored in the instruction buffer of the respective multi-stage instruction processing component. The decode stage and the execution logic of each respective multi-stage instruction processing component can be configured to process instructions belonging to a particular class of instructions for the instruction stream associated with the respective multi-stage instruction processing component.

In another embodiment, each respective multi-stage instruction processing component further includes an instruction cache operably coupled to the instruction fetch unit of the respective multi-stage instruction processing component. The instruction fetch unit of the respective multi-stage instruction processing component can have a configuration that fetches a cache line from the instruction cache of the respective multi-stage instruction processing component for supply to at least the instruction buffer of the respective multi-stage instruction processing component. The instruction fetch unit of the respective multi-stage instruction processing component can be configured such that, when fetching a cache line corresponding to an entry address for a given instruction block, only a select one of the instruction fetch units is enabled to fetch the cache line based on a predefined load balancing scheme, and multiple instruction buffers of the multi-stage instruction processing components are configured to store the cache line fetched by the select one instruction fetch unit.

In yet another embodiment, each given instruction block includes meta-data located at the entry address for the given instruction block. In one example, the meta-data can include data corresponding to the multiple distinct instruction streams within the given instruction block, wherein the data corresponding to a given instruction stream is used to control fetching operations of the corresponding instruction stream.

BRIEF DESCRIPTION OF THE DRAWINGS

FIG. 7 is a schematic illustration of exemplary fetch, decode and execute cycles performed in parallel by the CPU 101 of FIGS. 3 and 4 for a given instruction block.

DETAILED DESCRIPTION OF THE PREFERRED EMBODIMENTS

Illustrative embodiments of the disclosed subject matter of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

As used herein, the term "operation" is a unit of execution, such as an individual add, load, or control-flow operation.

The term "instruction" is a unit of logical encoding including a number of operations where all of the operations of the instruction are semantically performed together.

The term "bundle" is a unit of physical encoding comprising some or all of the operations of an instruction. Thus, an instruction decode stage decodes one bundle at a time.

Figure 1:
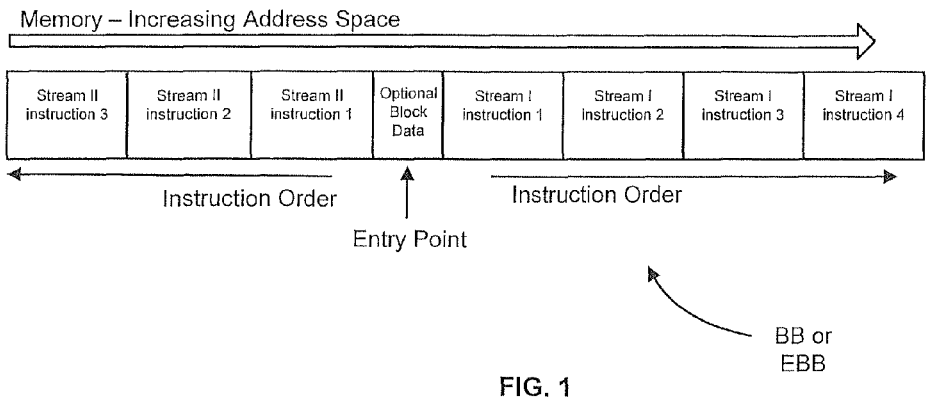
FIG. 1 is a schematic diagram of the logical organization of an instruction block according to an embodiment of the present disclosure, where the instruction block is loaded into the memory system of a computer processing system.
Figure 2:
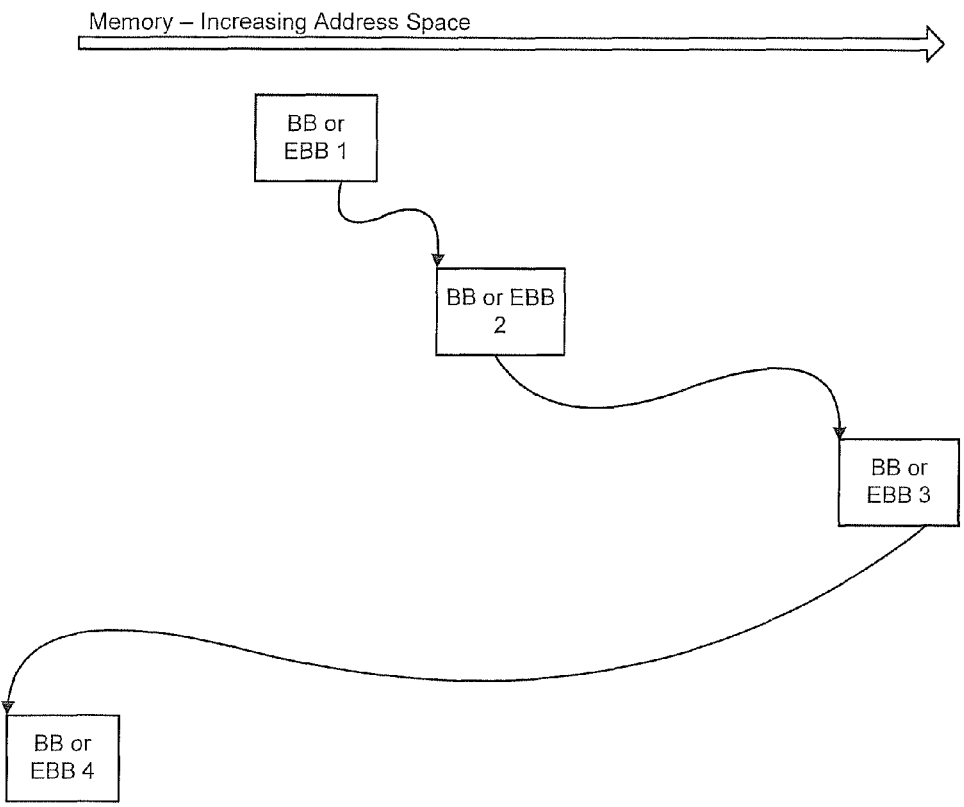
FIG. 2 is a schematic diagram illustrating a program represented by a sequence of instruction blocks of FIG. 1.

In accordance with the present disclosure, a program is loaded into and stored in a memory system as a set of instruction blocks within the memory system to be executed in logical sequence, not necessarily in memory sequence in either direction, as shown in FIGS. 1 and 2. An entry point (or entry address) is associated with each instruction block. Each instruction block includes two distinct instruction streams that are labeled as "Stream I" and "Stream II" in FIG. 1. Stream I includes a number of instructions (such as four instructions as shown) with an instruction order that logically extends in a direction of increasing memory space relative to the entry address of the instruction block. Stream II includes a number of instructions (such as three instructions as shown) with an instruction order that logically extends in a direction of decreasing memory space relative to the entry address of the instruction block. The stream I and the stream II instructions of the instruction block are entered at the entry address by a branch operation or other control-flow operation from some other instruction block or sequence, and will exit from the instruction block via another control-flow operation after executing some portion of the stream I and stream II instructions of the instruction block. An instruction block with one exit point (i.e., with one control-flow operation in the sequence of stream I and stream II instructions of the instruction block) is called a "basic instruction block" or "basic block" or BB. In this case, the one control-flow operation of the BB can be constrained to be part of the last instruction of the stream I or the stream II instructions of the BB. An instruction block with several possible exits point (i.e., with multiple control-flow operations in the sequence of stream I and stream II instructions of the instruction block) is called an "extended instruction block" or "extended basic block" or EBB. In this case, one of the multiple control-flow operations of the EBB can be constrained to be part of the last instruction of the stream I or the stream II instructions of the EBB.

Figure 3:
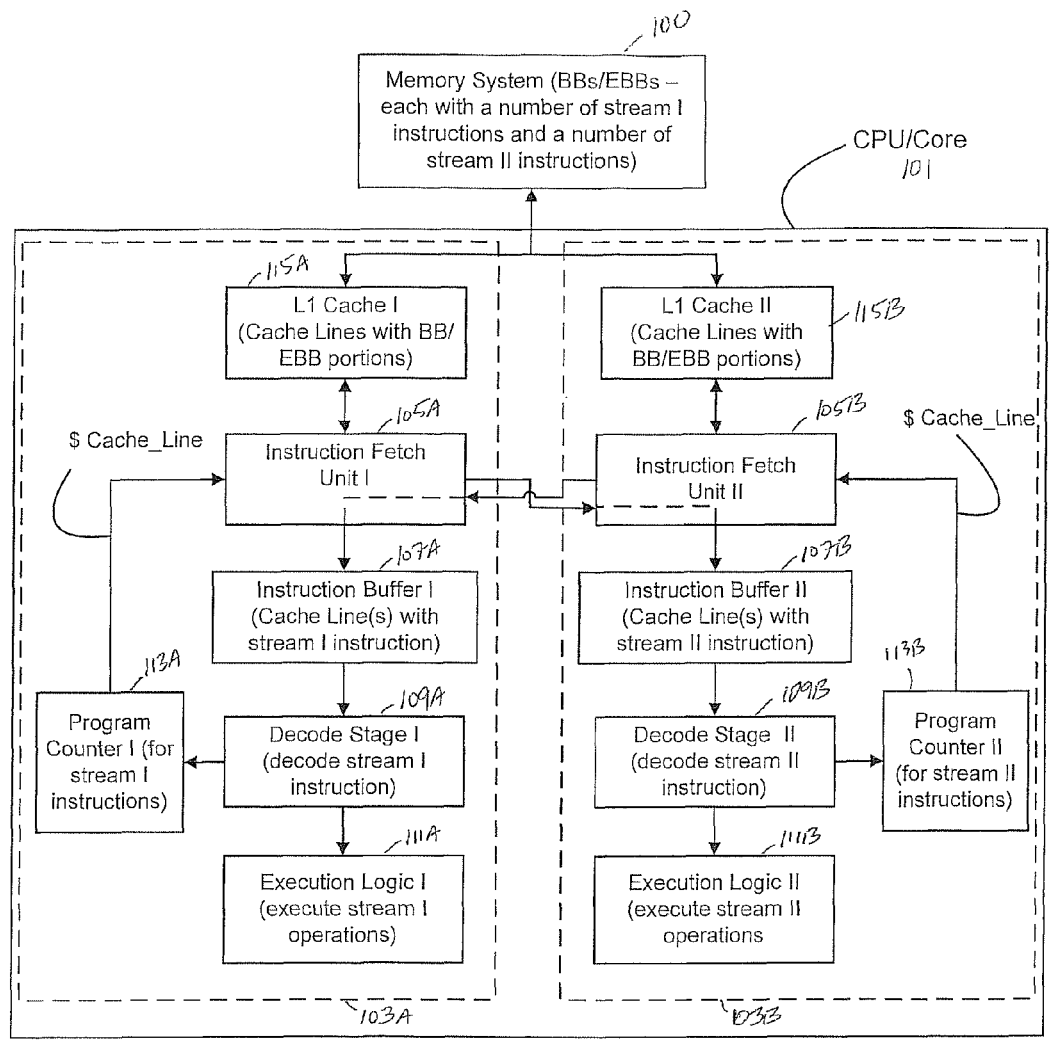
FIG. 3 is a schematic block diagram of a computer processing system according to an embodiment of the present disclosure.

The instruction blocks stored in the memory system 100 are accessed and processed by a CPU 101 as shown in the exemplary embodiment of FIG. 3. The CPU 101 includes two multi-stage instruction processing components 103A, 103B that operate to access and process in parallel the sequence of the two instruction streams I, II of particular instruction blocks stored in the memory system 100 according to the control flow defined by the execution of the instructions of the instruction blocks. In parallel-processing the two instruction streams I, II of a particular instruction block, the multi-stage instruction processing component 103A operates to access and process the instructions of the stream I for the particular instruction block while the multi-stage instruction processing component 103B simultaneously operates to access and process the instructions of the Stream II for the particular instruction block.

The multi-stage instruction processing component 103A includes a number of instruction processing stages (including an instruction fetch unit (labeled "Instruction Fetch Unit I", 105A), an instruction buffer (labeled "Instruction Buffer I", 107A), a decode stage (labeled "Decode Stage I", 109A) and execution logic (labeled "Execution Logic I", 111A)) that are arranged in a pipeline manner as shown. The multi-stage instruction processing component 103A also includes a program counter (labeled "Program Counter I" or "PC-I", 113A) and an L1 instruction cache (labeled "L1 Instruction Cache I", 115A).

The L1 instruction cache 115A is logically part of the hierarchy of the memory system 100. It is a cache that stores copies of instruction block portions stored in the memory system 100 in order to reduce the latency (i.e., the average time) for accessing the instruction block portions stored in the memory system 100. In order to reduce such latency, the L1 instruction cache 115A can take advantage of two types of memory localities, including temporal locality (meaning that the same instruction will often be accessed again soon) and spatial locality (meaning that the next memory access is often very close to the last memory access or recent memory accesses). The L1 instruction cache 115A can be organized as a set-associative cache structure, a fully associative cache structure, or a direct mapped cache structure as is well known in the art. The hierarchy of the memory system 100 can also include additional levels of cache memory, such as a level 2 and level 3 caches, as well as system memory. One or more of these additional levels of the cache memory can be integrated with the CPU 101 as is well known. The details of the organization of the memory hierarchy are not particularly relevant to the present disclosure and thus are omitted from the figures of the present disclosure for sake of simplicity.

The program counter 113A stores the memory address for a stream I instruction and thus indicates where the multi-stage instruction processing component 103A is in processing the sequence of stream I instructions in a given instruction block. The memory address stored in the program counter 113A can be used to control the fetching of stream I instructions by the instruction fetch unit 105A. Specifically, the program counter 113A can store the memory address for the stream I instruction to fetch. This memory address can be derived from a predicted (or resolved) target address of a control-flow operation, the saved address in the case of a return operation, or the sum of memory address of the previous stream I instruction and the length of previous stream I instruction. In some cases, the stream I instructions can be constrained such that they do not include control-flow operations. In this case, the memory address stored in the program counter 113A can be derived solely from the sum of memory address of the previous stream I instruction and the length of previous stream I instruction. The memory address stored in the program counter 113A can be logically partitioned into a number of high-order bits representing a cache line address ($ Cache Line) and a number of low-order bits representing a byte offset within the cache line for the stream I instruction.

The instruction fetch unit 105A, when activated, sends a request to the L1 instruction cache 115A to fetch a cache line from the L1 instruction cache 105A at a specified cache line address ($ Cache Line). This cache line address can be derived from the high-order bits of the program counter 113A (or possibly the program counter 113B in some circumstances). The L1 instruction cache 115A services this request (possibly accessing lower levels of the memory system if missed in the L1 instruction cache 115A), and supplies the requested cache line to the instruction fetch unit 105A. The instruction fetch unit 105A passes the cache line returned from the L1 instruction cache 115A to the instruction buffer 107A for storage therein. The instruction fetch unit 105A can also be configured to pass the cache line returned from the L1 instruction cache 115A to the instruction fetch unit 107B of the multi-stage instruction processing component 103B for storage in the instruction buffer 107B of the of the multi-stage instruction processing component 103B. The instruction fetch unit 105A can also be configured to receive a cache line returned from the L1 instruction cache 115B of the multi-stage instruction processing component 103B and pass the received cache line to the instruction buffer 107A for storage in the instruction buffer 107A.

The decode stage 109A of the multi-stage instruction processing component 103A is configured to decode one or more stream I instructions stored in the instruction buffer 107A. Such decoding can involve parsing the stream I instruction to determine the type of operation(s) encoded by the one or more stream I instructions, to determine the length of the stream I instruction (for the case where the stream I instructions can have variable-lengths), and generating control signals required for execution of the operations encoded by the one or more stream I instructions by the execution logic 111A. The execution logic 111A utilizes the results of the decode stage 109A to execute the operations encoded by the one or more stream I instructions. The possible operations encoded by a given stream I instruction can be constrained by design and organized into certain groups. In this case, the execution logic 111A can include functional units that are configured to execute certain one(s) of these groups as not others (such as one or more fixed-point unit for instructions with integer-based operations, one or more floating-point units for instructions with floating point operations, one or more "computational" functional units for instructions with "computational" operations, and one or more one or more functional units for flow-control operations, and for memory access operations), and the decode stage 109A can include decoders that are configured to decode the operations belonging to the different groups. The results of each decoder are then forwarded to the corresponding functional unit that executes the operation. The "computational" operations can involve no input and one output, one or more inputs and one or more outputs, one input and no output, and the "computational" functional units can employ a fixed number of non-repeating stages or stages that repeat their computational operations a fixed number of times to produce a result.

Similar to the multi-stage instruction processing component 103A, the multi-stage instruction processing component 103B includes a number of instruction processing stages (including an instruction fetch unit (labeled "Instruction Fetch Unit II", 105B), an instruction buffer (labeled "Instruction Buffer II", 107B), a decode stage (labeled "Decode Stage II", 109B) and execution logic (labeled "Execution Logic II", 111B)) that are arranged in a pipeline manner as shown. The multi-stage instruction processing component 103B also includes a program counter (labeled "Program Counter II" or "PC-II", 113B) and an L1 instruction cache (labeled "L1 Instruction Cache II", 115B).

The L1 instruction cache 115B is logically part of the hierarchy of the memory system 100. It is a cache that stores copies of instruction block portions stored in the memory system 100 in order to reduce the latency (i.e., the average time) for accessing the instruction block portions stored in the memory system 100. In order to reduce such latency, the L1 instruction cache 115B can take advantage of two types of memory localities, including temporal locality (meaning that the same instruction will often be accessed again soon) and spatial locality (meaning that the next memory access is often very close to the last memory access or recent memory accesses). The L1 instruction cache 115B can be organized as a set-associative cache structure, a fully associative cache structure, or a direct mapped cache structure as is well known in the art. The hierarchy of the memory system 100 can also include additional levels of cache memory, such as a level 2 and level 3 caches, as well as system memory as described above. The L1 instruction cache 115B can be of the same size as the L1 instruction cache 115A if the encodings and operations of the two instruction streams produce roughly similar demand for bytes. However, if the encoding and/or operations of the two instruction streams lead to imbalances demand for bytes, the two L1 instruction caches 115A, 115B can have different sizes. The larger one may have the same number of lines as the smaller but with a larger line size, or may have more lines of the same size. Which strategy will perform better in practice depends on the details of the demand and the structure of the hierarchy of the memory system 100.

The program counter 113B stores the memory address for a stream II instruction and thus indicates where the multi-stage instruction processing component 103B is in processing the sequence of stream II instructions in a given instruction block. The memory address stored in the program counter 113B can be used to control the fetching of stream II instructions by the instruction fetch unit 105B. Specifically, the program counter 113B can store the memory address for the stream II instruction to fetch. This memory address can be derived from a predicted (or resolved) target address of a control-flow operation, the saved address in the case of a return operation, or the sum of memory address of the previous stream II instruction and the length of previous stream II instruction. In some cases, the stream II instructions can be constrained such that they do not include control-flow operations. In this case, the memory address stored in the program counter 113B can be derived solely from the sum of memory address of the previous stream II instruction and the length of previous stream II instruction. The memory address stored in the program counter 113B can be logically partitioned into a number of high-order bits representing a cache line address ($ Cache Line) and a number of low-order bits representing a byte offset within the cache line for the stream II instruction.

The instruction fetch unit 105B, when activated, sends a request to the L1 instruction cache 115B to fetch a cache line from the L1 instruction cache 105B at a specified cache line address ($ Cache Line). This cache line address can be derived from the high-order bits of the program counter 113B (or possibly the program counter 113A in some circumstances). The L1 instruction cache 115B services this request (possibly accessing higher levels of the memory system if missed in the L1 instruction cache 115B), and supplies the requested cache line to the instruction fetch unit 105B. The instruction fetch unit 105B passes the cache line returned from the L1 instruction cache 115B to the instruction buffer 107B for storage therein. The instruction fetch unit 105B can also be configured to pass the cache line returned from the L1 instruction cache 115B to the instruction fetch unit 107A of the multi-stage instruction processing component 103A for storage in the instruction buffer 107A of the of the multi-stage instruction processing component 103A. The instruction fetch unit 105B can also be configured to receive a cache line returned from the L1 instruction cache 115A of the multi-stage instruction processing component 103A and pass the received cache line to the instruction buffer 107B for storage in the instruction buffer 107B.

The decode stage 109B of the multi-stage instruction processing component 103B is configured to decode one or more stream II instructions stored in the instruction buffer 107B. Such decoding can involve parsing the stream II instruction to determine the type of operation(s) encoded by the one or more stream II instructions, to determine the length of the stream II instruction (for the case where the stream I instructions can have variable-lengths), and generating control signals required for execution of the operations encoded by the one or more stream II instructions by the execution logic 111B. The execution logic 111B utilizes the results of the decode stage 109B to execute the operations encoded by the one or more stream II instructions. The possible operations encoded by a given stream II instruction can be constrained by design and organized into certain groups. In this case, the execution logic 111B can include functional units that are configured to execute certain one(s) of these groups as not others (such as one or more fixed-point unit for instructions with integer-based operations, one or more floating-point units for instructions with floating point operations, one or more "computational" functional units for instructions with "computational" operations, and one or more one or more functional units for flow-control operations, and for memory access operations), and the decode stage 109B can include decoders that are configured to decode the operations belonging to the different groups. The results of each decoder are then forwarded to the corresponding functional unit that executes the operation. The "computational" operations can involve no input and one output, one or more inputs and one or more outputs, one input and no output, and the "computational" functional units can employ a fixed number of non-repeating stages or stages that repeat their computational operations a fixed number of times to produce a result.

Figure 4:
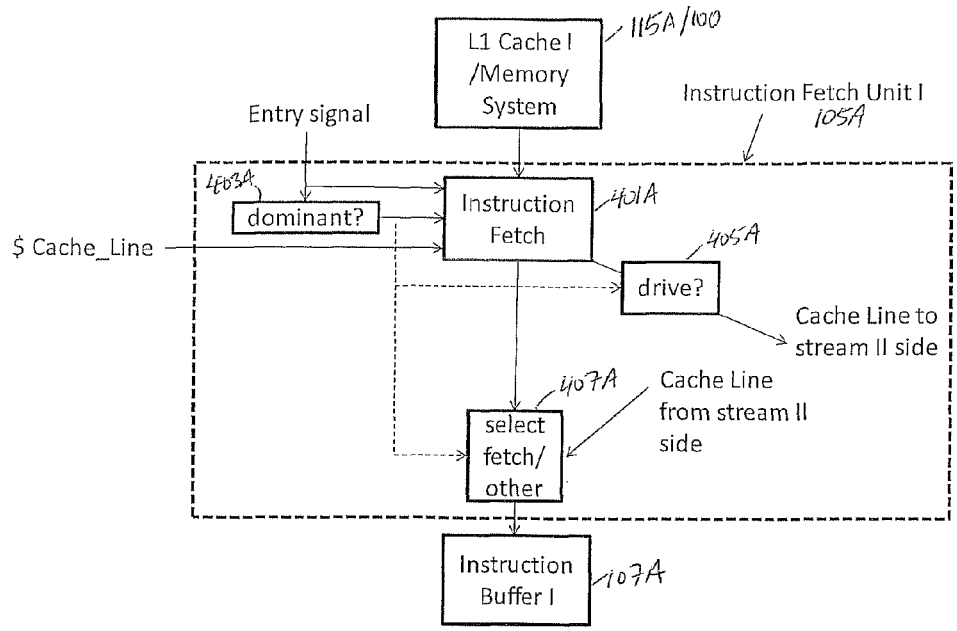
FIG. 4 is schematic illustration of exemplary circuit components that can be part of the computer processing system according to an embodiment of the present disclosure.

FIG. 4 is a schematic diagram that illustrates an exemplary embodiment of the instruction fetch unit 105A of FIG. 3. Note that the instruction fetch unit 105B can be a mirror image of the instruction fetch unit 105A of FIG. 4 and thus can include like components that are operably coupled between the L1 instruction cache 115B and the instruction buffer 107 and operate in a similar manner to the components of the instruction fetch unit 105A as described below. Specifically, the instruction fetch unit 105A includes an instruction fetch block 401A that is supplied with a cache line address (labeled "$ Cache_Line), an entry signal, and the output of a control circuit 403A (labeled "dominant?). The entry signal is set (raised) when the instruction sequence enters into a new instruction block. Otherwise, the entry signal is not set (cleared) and provides an indication that the fetch operations should fetch one or more sequential cache line(s) in the current instruction block. The entry signal can be generated by branch prediction logic (not shown) that is used to predict the outcome of conditional control-flow operations (such as conditional control-flow instructions) or by the execution logic 111A or 111B upon executing and resolving a conditional control-flow operation (such as when resolving a mispredicted control-flow instruction). The control circuit 403A is also supplied with the entry signal. The control circuit 403A is configured to selectively set (raise) a dominant signal, which is used along with the entry signal to selectively enable the instruction fetch block 401A in order to fetch the entry cache line into the new instruction block according to a load balancing scheme that is implemented by the control circuit 403A. Specifically, the control circuit 403A sets the dominant signal if and only if the entry signal is set and the load balancing scheme dictates that the instruction fetch block 401A should be activated for fetching the entry cache line for the instruction block. Under this load balancing scheme, the control circuit 403A allows the instruction fetch block 401A to fetch the entry cache line for some instruction blocks, but disables it for fetching the entry line for other instruction blocks. When the instruction fetch block 401A is disabled, the corresponding instruction fetch block 401B for the multi-stage instruction processing component 103B (not shown) is enabled to fetch the entry line for the instruction block. In this manner, the load balancing scheme distributes the fetching of entry cache lines between the two instruction fetch blocks 401A, 401B and the two L1 instruction caches 115A, 115B. In one embodiment, the load balancing scheme is configured to select one of the two instruction fetch blocks 401A, 401B based on the low order significant bit of the entry address for the instruction block. This effectively randomizes the selection of one of the two instruction fetch blocks 401A, 401B as well as the residence of the entry cache line the corresponding one of the two L1 instruction caches 115A, 115B.

When the dominant signal is set by the control circuit 403A (for fetching the entry cache line) or the entry signal is not set (for fetching sequential cache line(s) within an instruction block), the instruction fetch block 401A sends a request to the L1 instruction cache 115A to fetch a cache line from the L1 instruction cache 115A at a specified cache line address ($ Cache Line). The L1 instruction cache 115A services this request (possibly accessing lower levels of the memory system if missed in the L1 instruction cache 115A), and supplies the requested cache line to the instruction fetch block 401A. The instruction fetch block 401A passes the cache line returned from the L1 instruction cache 115A to drive circuitry 405A and to select fetch/other circuitry 407A.

The drive circuitry 405A is selectively enabled to pass the cache line returned from the L1 instruction cache 115A to the select fetch/other circuitry 407B for the multi-stage instruction processing component 103B (not shown) based on the dominant signal. Specifically, the drive circuitry 405A is enabled to pass the cache line returned from the L1 instruction cache 115A to the select fetch/other circuitry 407B for the multi-stage instruction processing component 103B if and only if the dominant signal is set. In this case, the select fetch/other circuitry 407B for the multi-stage instruction processing component 103B is configured to receive the cache line returned from the L1 instruction cache 115A and pass it to the instruction buffer 107B for storage therein.

The select fetch/other circuitry 407A is configured in one of two modes based on the signal levels of the dominant signal and the entry signal. Specifically, the select fetch/other circuitry 407A operates in a "select fetch" mode that passes the cache line returned from the L1 instruction cache 115A to the instruction buffer 107A for storage therein if and only if the dominant signal is set or the entry signal. In this manner, the "select fetch" mode is used to pass the cache line returned from the L1 instruction cache 115A to the instruction buffer 107A for storage therein for all fetches (including entry line fetches and sequential line fetches) performed by the instruction fetch block 401A. The select fetch/other circuitry 407A operates in a "select other" mode that receives the cache line returned from the L1 instruction cache 115B via the drive circuitry 405B for the multi-stage instruction processing component 103B and passes this received cache line to the instruction buffer 107A for storage therein if and only if the dominant signal is not set and the entry signal is set. In this manner, the "select other" mode is used to receive the cache line returned from the L1 instruction cache 115B and pass it to the instruction buffer 107A for storage therein for all entry line fetches performed by the instruction fetch block 401B of the multi-stage instruction processing component 103B. With these operations, the entry cache line for the instruction block is stored in both instruction buffers 107A, 107B. This is useful due to the organization of the instruction block which shares a common entry address across the two instruction streams I, II. With this organization, the entry cache line will be available for use by the decoder stages 109A, 109B for both streams I, II when entering the instruction block.

Note that the CPU 101 employ caches 115A, 115B to mitigate the delay in accessing the instruction blocks from the memory system 100. So long as an instruction block portion needed for execution of the program is located in the caches 115A, 115B, then the execution of the program will not be delayed by requesting instructions from the lower levels of the hierarchy of the memory system 100. However, if a needed instruction block portion is not in caches 115A, 115B, then the program must stall while it is accessed from the lower levels of the hierarchy of the memory system 100. Executed instructions are frequently re-executed in the near future, so any fetched from memory will also be placed in the cache for when next needed, replacing some other instruction that seems less likely to be needed soon.

The totality of instructions actually executed in a CPU over a brief period is called its working set. If the capacity of the cache is big enough to hold the working set, then the program can be executed with infrequent need to fetch instruction from memory with the concomitant delay. However, if the cache is smaller than the working set, then the instruction replaced by one fetched from memory will soon be needed again and have to be re-fetched, only to replace a different soon-needed instruction. This condition of endless instruction replacement, called thrashing, is well known. Thrashing can severely damage program performance. While thrashing can be somewhat ameliorated by reorganizing the program, the only real solution is a larger instruction cache, one large enough to hold the working set of the program. Unfortunately, large caches are expensive in chip area and power, and introduce extra delay in obtaining instructions from the cache. Balancing the need for larger instruction caches against their costs is an important consideration in designing a CPU. Note that for any given cache size and encoding there is a limit to the size of working set that can fit into a cache without thrashing.

In the instruction block organization of the present disclosure, instructions are organized into two or more disjoint instruction streams with each instruction stream having its own instruction cache. With multiple instruction caches and hence a large number of cache lines, the CPU 101 as described herein can ameliorate the thrashing problem by accommodating working sets that are much larger than can be handled by a single cache. And, unlike a very large single cache, the multiple caches do not incur extra delay for instruction access.

Moreover, the instruction streams are located adjacent in memory at the block entry point. Hence the cache line that contains the entry point will contain some leading fraction of both streams. In the CPU 101 described above, only a single copy of the entry cache line is stored in one of the instruction caches of the CPU, while the entry cache line is stored in multiple instruction buffers. Thereafter, the decoder stage for each respective instruction stream will fetch subsequent instructions from lines in its assigned instruction cache only, because only these lines contain instructions from the desired stream and not from the other steam. This eliminates duplication across the multiple caches.

Figure 5:
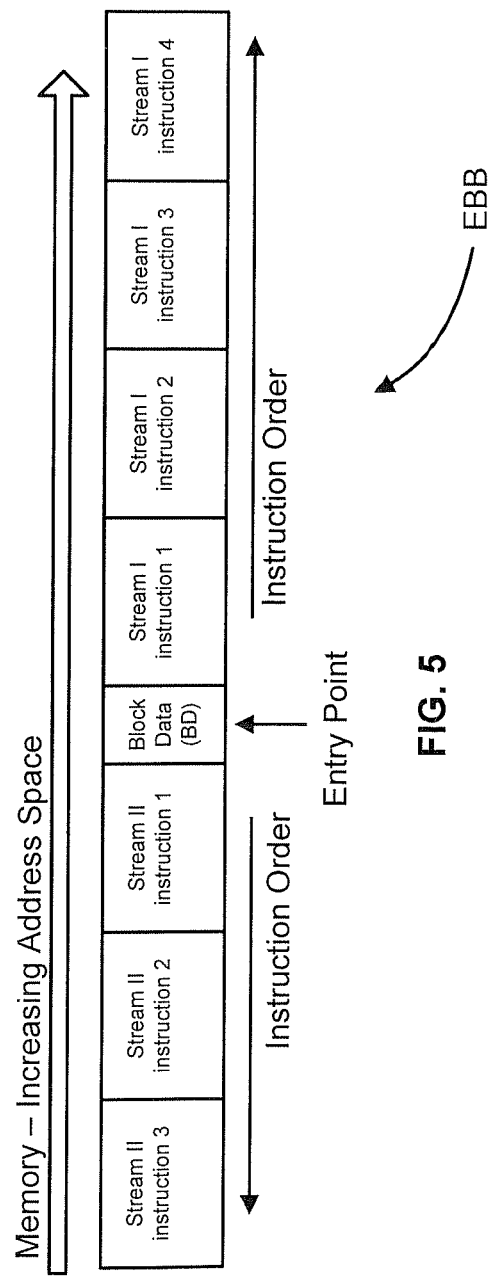
FIG. 5 is a schematic diagram of the logical organization of an instruction block according to another embodiment of the present disclosure, where the instruction block is loaded into the memory system of a computer processing system.

FIG. 5 is a block diagram illustrating an exemplary format for instruction blocks as described herein. In this exemplary format, an entry point (or entry address) is associated with each instruction block. Meta-data for the block (labeled "Block Data") is located at the entry point. Each instruction block includes two distinct instruction streams that are labeled as "Stream I" and "Stream II" in FIG. 5. Stream I includes a number of instructions (such as four instructions as shown) with an instruction order that logically extends in a direction of increasing memory space relative to the entry address of the instruction block. The stream I instructions of the instruction block are concatenated together according to an instruction order that extends from the entry point toward increasing memory space relative to the entry point. The head (first one) of these stream I instructions is located adjacent the Block Data in the increasing memory space relative to the entry point. Stream II includes a number of instructions (such as three instructions as shown) with an instruction order that logically extends in a direction of decreasing memory space relative to the entry address of the instruction block. The stream II instructions of the instruction block are concatenated together according to an instruction order that extends from the entry point toward decreasing memory space relative to the entry point. The head (first one) of these stream II instructions is located adjacent the Block Data in the decreasing memory space relative to the entry point. In this configuration, the first stream I instruction is located adjacent one end of the Block Data and first stream II instruction is located adjacent the opposite end of the Block Data as shown. Similar to the instruction blocks of FIG. 1, an instruction block with one exit point (i.e., with one control-flow operation in the sequence of stream I and stream II instructions of the instruction block) is called a "basic instruction block" or "basic block" or BB. In this case, the one control-flow operation of the BB can be constrained to be part of the last instruction of the stream I or the stream II instructions of the BB. An instruction block with several possible exits point (i.e., with multiple control-flow operations in the sequence of stream I and stream II instructions of the instruction block) is called an "extended instruction block" or "extended basic block" or EBB. In this case, one of the multiple control-flow operations of the EBB can be constrained to be part of the last instruction of the stream I or the stream II instructions of the EBB.

The Block Data can contain information useful for processing the instructions of the instruction block. In one example, the Block Data includes two fields BD-I, BD-II corresponding to the two instruction streams I, II that encode information used to control fetching operations for the two instruction streams I, II. Specifically, the field BD-I encodes information that identifies the maximum number of sequential cache lines that are to be fetched for the stream I instructions of the instruction block. These sequential cache lines are found in increasing memory space corresponding to the instruction order of the stream I instructions as shown in FIG. 5. Similarly, the field BD-II encodes information that identifies the maximum number of sequential cache lines that are to be fetched for the stream II instructions. These sequential cache lines are found in decreasing memory space corresponding to the instruction order of the stream II instructions as shown in FIG. 5. In other embodiments, the Block Data can encode other useful information, such as hints or guides for branch prediction operations with respect to the instruction block, security codes to detect code-overwrite exploits and/or memory error operations within the instruction block, source code locators for use by a debugger, and others.

Figure 6:
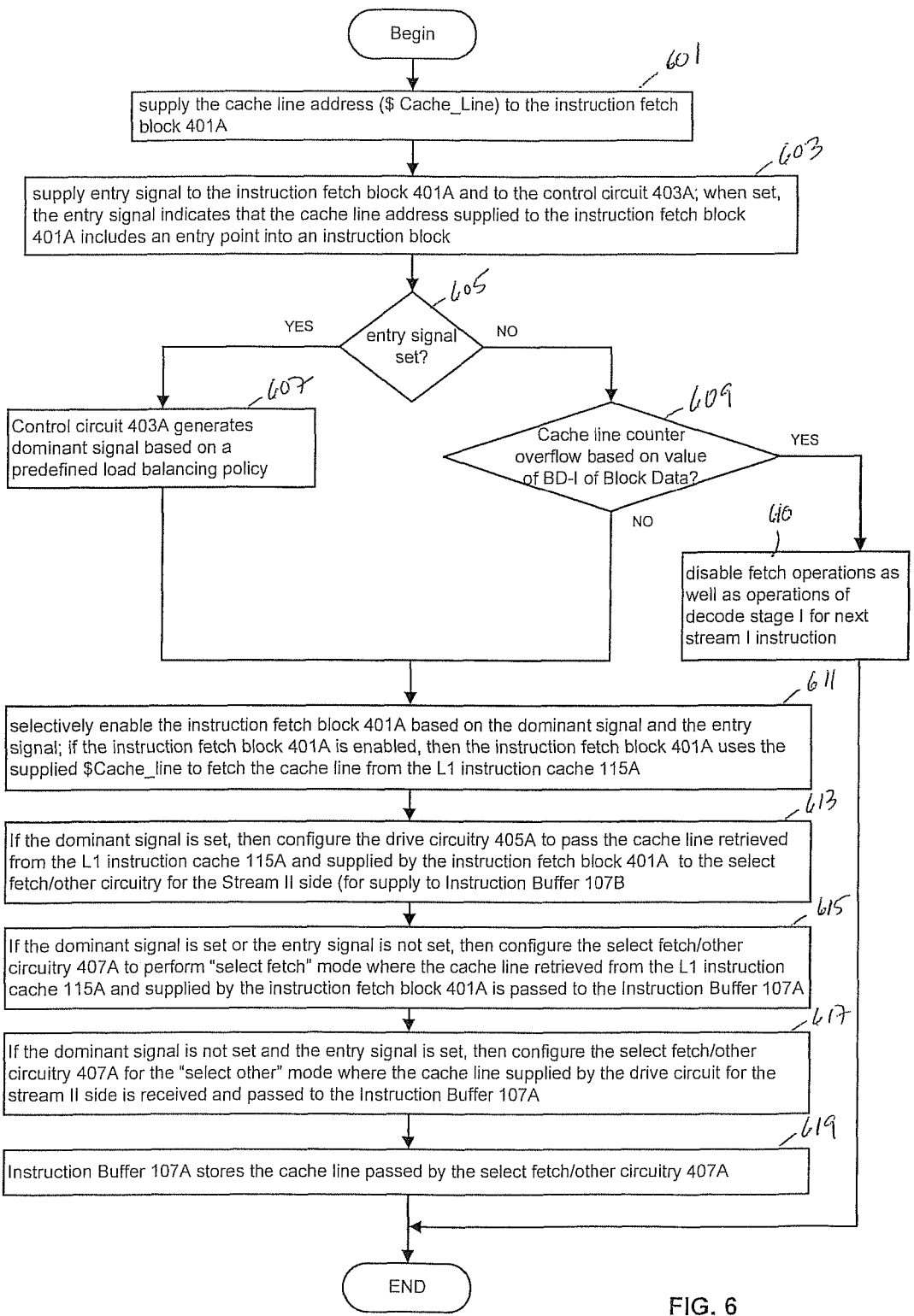
FIG. 6 is a flow chart that illustrates exemplary operations carried out by one of the instruction fetch units of FIG. 4 which is adapted to utilize the Block Data for an instruction block according to FIG. 5 in order to control fetching operations for certain instructions of the instruction block.

FIG. 6 is a flow chart that illustrates exemplary operations carried out by the instruction fetch unit 105A of FIG. 4 which is adapted to utilize the Block Data for an instruction block according to FIG. 5 in order to control fetching operations for the stream I instructions of the instruction block. Note that similar operations are carried out by the instruction fetch unit 105B for fetching the stream II instructions of the instruction block. The operations begin in 601 where a cache line address ($ Cache_Line) is supplied to the instruction fetch block 401.

In 603, the entry signal is supplied to the instruction fetch block 401A and to the control circuit 403A. As described above, when set the entry signal indicates that the cache line address supplied to the instruction fetch block 401A includes an entry point into an instruction block.

In 603 and 605, the control circuit 403A evaluates the entry signal and predefined load balancing scheme as described above in order to generate an appropriate bit valve (set or clear) based on the entry signal and the load balancing scheme. Specifically, the control circuit 403A sets the dominant signal if and only if the entry signal is set and the load balancing scheme dictates that the instruction fetch block 401A should be activated for fetching the entry cache line for the instruction block.

As part of 605, the instruction fetch block 401A also evaluates the entry signal. If the entry signal is not set, the operations of the instruction fetch block 401A continues to 607 where it determines if a cache line counter exceeds the maximum number of sequential cache lines that are to be fetched for the stream I instructions of the instruction block as encoded by the BD-I field of the instruction block. The cache line counter is initialized when fetching the entry cache line for a given instruction block and incremented when fetching each successive cache line. If so, the operations of the instruction fetch block 401 continue to 610 where further fetching of stream I instructions is disabled and the decode stage 109A is disabled for the next stream I instruction. The operation of 609 and 610 thus limits the fetching operations of the stream I instructions such that sequential execution of the stream I instructions of the instruction block never proceed beyond the end of the whole instruction block. If the cache line counter does not exceed the maximum number of sequential cache lines that are to be fetched for the stream I instructions of the instruction block, the operations of the instruction fetch block 401A continue to 611.

In step 611, the instruction fetch block 401A is selectively enabled based on the dominant signal and the entry signal. Specifically, the instruction fetch block 401A is enabled when the dominant signal is set (for fetching the entry cache line) or the entry signal is not set (for fetching sequential cache line(s) within an instruction block). If the instruction fetch block 401A is enabled, the instruction fetch block 401A sends a request to the L1 instruction cache 115A to fetch a cache line from the L1 instruction cache 115A at a specified cache line address ($ Cache Line). The L1 instruction cache 115A services this request (possibly accessing higher levels of the memory system if missed in the L1 instruction cache 115A), and supplies the requested cache line to the instruction fetch block 401A. The instruction fetch block 401A passes the cache line returned from the L1 instruction cache 115A to drive circuitry 405A and to select fetch/other circuitry 407A.

In step 613, the drive circuitry 405A is selectively enabled to pass the cache line returned from the L1 instruction cache 115A to the select fetch/other circuitry 407B for the multi-stage instruction processing component 103B (not shown) based on the dominant signal. Specifically, the drive circuitry 405A is enabled to pass the cache line returned from the L1 instruction cache 115A to the select fetch/other circuitry 407B if and only if the dominant signal is set. In this case, the select fetch/other circuitry 407B for the multi-stage instruction processing component 103B is configured to receive the cache line returned from the L1 instruction cache 115A and pass it to the instruction buffer 107B for storage therein.

In step 617, the select fetch/other circuitry 407A is configured in one of two modes based on the signal levels of the dominant signal and the entry signal. Specifically, the select fetch/other circuitry 407A operates in a "select fetch" mode that passes the cache line returned from the L1 instruction cache 115A to the instruction buffer 107A for storage therein if and only if the dominant signal is set or the entry signal. In this manner, the "select fetch" mode is used to pass the cache line returned from the L1 instruction cache 115A to the instruction buffer 107A for storage therein for all fetches (including entry line fetches and sequential line fetches) performed by the instruction fetch block 401A. The select fetch/other circuitry 407A operates in a "select other" mode that receives the cache line returned from the L1 instruction cache 115B via the drive circuitry 405B for the multi-stage instruction processing component 103B and passes this received cache line to the instruction buffer 107A for storage therein if and only if the dominant signal is not set and the entry signal is set. In this manner, the "select other" mode is used to receive the cache line returned from the L1 instruction cache 115B and pass it to the instruction buffer 107A for storage therein for all entry line fetches performed by the instruction fetch block 401B of the multi-stage instruction processing component 103B.

In step 619, the cache line passed by the select fetch/other circuitry 407A in 617 is stored in the instruction buffer 107A.

With these operations, the entry cache line for the instruction block is stored in both instruction buffers 107A, 107B. This is useful due to the organization of the instruction block which shares a common entry address across the two instruction streams I, II. With this organization, the entry cache line will be available for use by the decoder stages 109A, 109B for both streams I, II when entering the instruction block.

In other embodiments, it is contemplated that the BD-I field and/or the BD-II field can encode information that represents that there is no maximum limit to the number of sequential cache lines that are to be fetched for the correspond instruction streams I, II. In this case, the BD field can be used to treat the cache line counter as a saturating counter that bypasses the operations of 610 and thus places no limit on the fetching of instructions beyond the end of an instruction block.

In the instruction formats described herein, there can be one or more semantic relationships between the stream I instructions and the stream II instruction of a given instruction block that relate to the manner that the stream I instructions and the stream II instruction of a given instruction block are decoded by the decode stages 109A, 109B and issued for execution by the execution logic 111A, 11B of the multi-stage instruction processing components 103A, 103B.

For example, the stream I instructions and the stream II instructions of the given instruction block can be decoded in a synchronous lock step manner, where one stream I instruction and one stream II instruction are taken as a matching pair that are synchronously decoded together.

In another example, the stream I instructions and the stream II instructions of the given instruction block can be decoded in a non-synchronous lock step manner where one stream I instruction or one stream II instruction is taken in an alternating manner according to some defined ratio and decoded in a non-synchronous manner with respect to one another.

In yet another example, the stream I instructions and the stream II instructions of the given instruction block can be decoded and issued for execution in a synchronous manner where there is not necessarily lock step coordination between the two instruction streams. In this example, the operations(s) of a stream I instruction of the given instruction block can issue together with the operations of a stream II instruction of the given instruction block, or the operation(s) of either the stream I instruction or the stream II instruction (but not both) of the given instruction block can issue together, or the issuance of operation(s) of either the stream I instruction and/or the stream II instruction of the given instruction block can be paused for some determined time.

In another example, the stream I instructions and the stream II instructions of the given instruction block can be decoded and issued for execution in an asynchronous manner where the stream I instructions and the stream II instructions are decoded and issued as efficiently as possible. In this case, the issuance of one of the instruction streams (i.e., "leading stream") can lead the issuance of the other instruction stream (i.e., the "lagging stream") and violate program semantics. In order to avoid this situation and preserve the program semantics, the leading stream can be paused until the lagging stream catches up.

In all of these examples, there is a potential semantic dependency between any instruction and any other instructions decoded and executed simultaneously or subsequently, and the details of such semantic dependencies vary according to the examples given above.

FIG. 7 is a schematic illustration of exemplary fetch, decode and execute cycles performed in parallel by the CPU 101 of FIGS. 3 and 4 for a given instruction block. In this example, the stream I instructions and the stream II instructions of the given instruction block are decoded and issued for execution in a synchronous lock step manner, where one stream I instruction and one stream II instruction are taken as a matching pair that are synchronously decoded and executed together. Note that this sequence includes execution of four stream I and four stream II instructions of a complete instruction block. It is contemplated that in other examples, execution (whether speculative or not) of control-flow operations within an instruction block can branch the program sequence to another instruction block before completing the instruction block. In this case, the CPU 101 can be performing parts of the fetch, decode and execute cycles in parallel for more than one instruction block. Furthermore, note that the synchronization and lock step nature of the various fetching, decoding, and execution operations of the instruction streams in FIG. 7 is exemplary nature and thus can be varied greatly across designs in accordance with the semantic dependencies of the instruction streams of an instruction block as well as the program semantics as described above.

The organization of the processor and its method of operation as described herein can provide several advantages, not all of which will be applicable depending on other aspects of the processor design.

For example, the capacity of the top-level instruction cache can be effectively doubled, without increasing the latency arising from the physical dimensions of a cache of a given capacity. Moreover, the cache bandwidth requirement of each cache is effectively halved for a given overall instruction bandwidth.

In another example, for a variable-length encoding of instructions in which more than one instruction must be decoded together, the parse complexity and latency of decode can be effectively reduced by a polynomial factor that is at least a factor of two. Furthermore, there can be a natural location for extra-instruction meta-information that may be used in the decoding process. Specifically, the meta-information can be used to prevent over-fetching of lines that will not be used, reducing cache bandwidth demand and clutter.

There have been described and illustrated herein several embodiments of a computer process and corresponding method of operations. While particular embodiments of the invention have been described, it is not intended that the invention be limited thereto, as it is intended that the invention be as broad in scope as the art will allow and that the specification be read likewise. For example, the functionality of the CPU 101 as described herein can be embodied as a processor core and multiple instances of the processor core can be fabricated as part of a single integrated circuit (possibly along with other structures). It will therefore be appreciated by those skilled in the art that yet other modifications could be made to the provided invention without deviating from its spirit and scope as claimed.

What is claimed is:

1. A computer processing system comprising:
   a memory system that is configured to store a plurality of instruction blocks, wherein each instruction block is associated with an entry address and multiple distinct instruction streams within the instruction block, wherein the multiple distinct instruction streams include at least a first instruction stream and a second instruction stream, the first instruction stream having a plurality of instructions with an instruction order that logically extends in a direction of increasing memory space relative to said entry address, and the second instruction stream having a plurality of instructions with an instruction order that logically extends in a direction of decreasing memory space relative to said entry address;
   a computer processor, operably coupled to the memory system, including a plurality of multi-stage instruction processing components corresponding to the multiple distinct instruction streams within each instruction block, wherein the plurality of multi-stage instruction processing components each include a program counter, an instruction fetch unit and an associated instruction buffer, which are configured to access and process in parallel instructions belonging to multiple distinct instruction streams of a particular instruction block stored in the memory system.

2. A computer processing system according to claim 1, wherein:
   the multiple distinct instruction streams of each instruction block include a single control-flow operation or multiple control-flow operations.

3. A computer processing system according to claim 1, wherein:
   the multiple distinct instruction streams of each instruction block comprise different classes of instructions; and
   each of the multi-stage instruction processing components is associated with at least one corresponding class of instructions, and each respective multi-stage instruction processing component is configured to process instructions belonging to a particular class of instructions associated therewith.

4. A computer processing system according to claim 3, wherein:
   the classes of instructions include at least a first class of instructions and a second class of instructions;
   the first class of instructions includes instructions that perform flow-control operations and instructions that perform memory reference operations;
   the second class of instructions includes instructions that perform computational operations;
   a first multi-stage instruction processing component is configured to process instructions belonging to the first class of instructions; and a second multi-stage instruction processing component is configured to process instructions belonging to the second class of instructions.

5. A computer processing system according to claim 1, wherein:
the program counter of a respective multi-stage instruction processing component has a configuration that stores a memory address for an instruction belonging to a corresponding instruction stream of a particular instruction block stored in the memory system;
the instruction fetch unit of the respective multi-stage instruction processing component has a configuration that fetches from the memory system at least one instruction belonging to the corresponding instruction stream of the particular instruction block; and
the instruction buffer of the respective multi-stage instruction processing component has a configuration that stores at least one instruction fetched from the memory system by the instruction fetch unit of the respective multi-stage instruction processing component.

6. A computer processing system according to claim 5, wherein:
each given instruction block includes meta-data located at the entry address for a given instruction block.

7. A computer processing system according to claim 6, wherein:
the meta-data includes data corresponding to the multiple distinct instruction streams within each instruction block, wherein the data corresponding to a given instruction stream is used to control fetching operations of the given instruction stream.

8. A computer processing system according to claim 7, wherein:
the meta-data includes first data corresponding to the first instruction stream within each instruction block and second data corresponding to the second instruction stream within each instruction block;
wherein the first data is used to control fetch operations with respect to sequential cache lines located in increasing memory space relative to the entry address for a given instruction block, and the second data is used to control fetching operations with respect to sequential cache lines located in decreasing memory space relative to the entry address for the given instruction block.

9. A computer processing system according to claim 1, wherein:
each respective multi-stage instruction processing component further includes a decode stage and associated execution logic that are configured to process the at least one instruction stored in the instruction buffer of the respective multi-stage instruction processing component.

10. A computer processing system according to claim 9, wherein:
the instructions of the multiple distinct instruction streams of each instruction block are logically organized into classes of instructions; and
the decode stage and the execution logic of each respective multi-stage instruction processing component are configured to process instructions belonging to at least one class of instructions for the instruction stream associated with the respective multi-stage instruction processing component.

11. A computer processing system according to claim 9, wherein:
each respective multi-stage instruction processing component further includes an instruction cache operably coupled to the instruction fetch unit of the respective multi-stage instruction processing component, wherein the instruction fetch unit of the respective multi-stage instruction processing component has a configuration that fetches a cache line from the instruction cache of the respective multi-stage instruction processing component for supply to at least the instruction buffer of the respective multi-stage instruction processing component.

12. A computer processing system according to claim 11, wherein:
the instruction fetch units of the multi-stage instruction processing components are configured such that, when fetching a cache line corresponding to an entry address for a given instruction block, only a select one of the instruction fetch units is enabled to fetch the cache line based on a predefined load balancing scheme, and multiple instruction buffers of the multi-stage instruction processing components are configured to store the cache line fetched by the select one instruction fetch unit.

13. A computer processing system according to claim 12, wherein:
the instruction fetch unit of each respective multi-stage instruction processing component is configured to fetch a cache line based on a cache line address supplied thereto, wherein the cache line address supplied thereto corresponds to one of an entry address for a given instruction block and an address for an instruction belonging to the corresponding instruction stream within a given instruction block.

14. A computer processing system according to claim 13, wherein:
the entry address for a given block is derived from the memory address stored in one of the program counters of the multi-stage instruction processing components, which represents the results of prediction or resolution of a control-flow operation.

15. A method of processing instructions in a computer processing system, the method comprising:
storing a plurality of instruction blocks in a memory system, wherein each instruction block is associated with an entry address and multiple distinct instruction streams within the instruction block, wherein the multiple distinct instruction streams include at least a first instruction stream and a second instruction stream, the first instruction stream having a plurality of instructions with an instruction order that logically extends in a direction of increasing memory space relative to said entry address, and the second instruction stream having a plurality of instructions with an instruction order that logically extends in a direction of decreasing memory space relative to said entry address;
providing a computer processor including a plurality of multi-stage instruction processing components corresponding to the multiple distinct instruction streams within each instruction block, wherein the plurality of multi-stage instruction processing components each include a program counter, an instruction fetch unit and an associated instruction buffer, which are configured to access and process in parallel instructions belonging to multiple distinct instruction streams of a particular instruction block stored in the memory system.

16. A method according to claim 15, wherein:
the instructions of the multiple distinct instruction streams within each instruction block include a single control-flow operation or multiple control-flow operations.

17. A method according to claim 15, wherein:
the multiple distinct instruction streams of each instruction block comprise different classes of instructions; and each of the multi-stage instruction processing components is associated with at least one corresponding class of instructions, and each respective multi-stage instruction processing component is configured to process instructions belonging to a particular class of instructions associated therewith.

18. A method according to claim 17, wherein:
the classes of instructions include at least a first class of instructions and a second class of instructions;
wherein the first class of instructions includes instructions that perform flow-control operations and instructions that perform memory reference operations;
the second class of instructions includes instructions that perform computational operations;
a first multi-stage instruction processing component is configured to process instructions belonging to the first class of instructions; and
a second multi-stage instruction processing component is configured to process instructions belonging to the second class of instructions.

19. A method according to claim 15, wherein:
each respective multi-stage instruction processing component further includes an instruction cache operably coupled to the instruction fetch unit of the respective multi-stage instruction processing component; and
the method further comprises configuring the instruction fetch unit of each respective multi-stage instruction processing component to fetch at least one cache line from the instruction cache of the respective multi-stage instruction processing component.

20. A method according to claim 19, further comprising:
configuring the instruction fetch units of the multi-stage instruction processing components such that, when fetching a cache line corresponding to an entry address for a given block, only a select one of the instruction fetch units is enabled to fetch the cache line based on a predefined load balancing scheme.

21. A method according to claim 20, further comprising:
configuring the instruction fetch unit of each respective multi-stage instruction processing component to fetch a cache line based on a cache line address supplied thereto, wherein the cache line address supplied thereto corresponds to one of an entry address for a given instruction block and an address for an instruction belonging to the corresponding instruction stream within a given instruction block.

22. A method according to claim 21, further comprising:
deriving the entry address for a given instruction block based on the memory address stored in one of multiple program counters for the multi-stage instruction processing components, which represents the results of prediction or resolution of a control-flow operation.

23. A method according to claim 15, wherein:
each given instruction block includes meta-data located at the entry address for a given instruction block.

24. A method according to claim 23, wherein:
the meta-data includes data corresponding to the multiple distinct instruction streams within each instruction block, wherein the data corresponding to a given instruction stream is used to control fetching operations of the given instruction stream.

25. A method according to claim 24, wherein:
the meta-data includes first data corresponding to the first instruction stream within each instruction block and second data corresponding to the second instruction stream within each instruction block; and the method further comprises using the first data to control fetch operations with respect to sequential cache lines located in increasing memory space relative to the entry address for a given instruction block, and using the second data to control fetching operations with respect to sequential cache lines located in decreasing memory space relative to the entry address for the given instruction block.

26. A computer processor comprising:
a plurality of multi-stage instruction processing components that are configured to access and process instructions belonging to corresponding multiple distinct instruction streams that are part of at least one instruction block, wherein the instruction block is associated with an entry address and multiple distinct instruction streams within the instruction block, wherein the multiple distinct instruction streams include at least a first instruction stream and a second instruction stream, the first instruction stream having a plurality of instructions with an instruction order that logically extends in a direction of increasing memory space relative to said entry address, and the second instruction stream having a plurality of instructions with an instruction order that logically extends in a direction of decreasing memory space relative to said entry address;
wherein the plurality of multi-stage instruction processing components each include a program counter, an instruction fetch unit and an associated instruction buffer, which are configured to access and process in parallel instructions belonging to the multiple distinct instruction streams of a particular instruction block stored in the memory system.

27. A computer processor according to claim 26, wherein:
the program counter of each respective multi-stage instruction processing component has a configuration that stores a memory address for an instruction belonging to corresponding instruction stream of a particular instruction block;
the instruction fetch unit of each respective multi-stage instruction processing component has a configuration that fetches at least one instruction belonging to the corresponding instruction stream of the particular instruction block; and
the instruction buffer of each respective multi-stage instruction processing component has a configuration that stores the at least one instruction fetched by the instruction fetch unit of the respective multi-stage instruction processing component.

28. A computer processor according to claim 26, wherein:
each respective multi-stage instruction processing component further includes a decode stage and execution logic that are configured to process the at least one instruction stored in the instruction buffer of the respective multi-stage instruction processing component.

29. A computer processor according to claim 28, wherein:
the multiple distinct instruction streams of each instruction block comprise different classes of instructions; and
the decode stage and the execution logic of each respective multi-stage instruction processing component are configured to process instructions belonging to at least one class of instructions for the instruction stream associated with the respective multi-stage instruction processing component.

30. A computer processor according to claim 26, wherein:
each respective multi-stage instruction processing component further includes an instruction cache operably coupled to the instruction fetch unit of the respective multi-stage instruction processing component, wherein the instruction fetch unit of the respective multi-stage instruction processing component has a configuration that fetches a cache line from the instruction cache of the respective multi-stage instruction processing component for supply to at least the instruction buffer of the respective multi-stage instruction processing component.

* * * * *